United States Patent
Iqbal et al.

(10) Patent No.: US 10,826,036 B2
(45) Date of Patent: Nov. 3, 2020

(54) BATTERY PACK VENTING

(71) Applicant: FORD GLOBAL TECHNOLOGIES, LLC, Dearborn, MI (US)

(72) Inventors: Asif Iqbal, Macomb, MI (US); Daniel Miller, Dearborn, MI (US); James Lawrence Swoish, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1499 days.

(21) Appl. No.: 14/336,418

(22) Filed: Jul. 21, 2014

(65) Prior Publication Data

US 2016/0020448 A1   Jan. 21, 2016

(51) Int. Cl.
*H01M 2/12*      (2006.01)
*H01M 10/6554*   (2014.01)
*H01M 2/10*      (2006.01)
*H01M 10/0525*   (2010.01)

(52) U.S. Cl.
CPC ....... *H01M 2/1252* (2013.01); *H01M 2/1077* (2013.01); *H01M 10/6554* (2015.04); *H01M 10/0525* (2013.01); *H01M 2220/20* (2013.01); *Y02E 60/10* (2013.01)

(58) Field of Classification Search
CPC ............. H01M 2/1252; H01M 6/5038; H01M 8/0267; H01M 10/60; H01M 10/613; H01M 10/0525; H01M 10/6554; H01M 2220/20; H01M 2/1077; Y02E 60/122; Y02E 60/10
See application file for complete search history.

(56) References Cited

U.S. PATENT DOCUMENTS

| | | | | |
|---|---|---|---|---|
| 3,633,586 A | * | 1/1972 | Sheridan | A61M 16/04 128/207.15 |
| 6,278,259 B1 | * | 8/2001 | Kimoto | H01M 2/1252 320/147 |
| 6,641,949 B2 | | 11/2003 | Cheiky et al. | |
| 7,294,429 B2 | | 11/2007 | Anglin et al. | |
| 8,420,250 B2 | | 4/2013 | Kim et al. | |
| 2009/0258288 A1 | * | 10/2009 | Weber | H01M 2/10 429/120 |
| 2010/0009244 A1 | * | 1/2010 | Murata | H01M 2/12 429/53 |
| 2010/0173181 A1 | | 7/2010 | Okada | |
| 2012/0045672 A1 | | 2/2012 | Kruger | |

(Continued)

FOREIGN PATENT DOCUMENTS

CN    102656718       9/2012
EP    2450980 A2      5/2012

OTHER PUBLICATIONS

Zolot, "Thermal Evaluation of Toyota Prius Battery Pack", National Renewable Energy Laboratory, 2002.

*Primary Examiner* — Lingwen R Zeng
(74) *Attorney, Agent, or Firm* — David B. Kelley; Carlson, Gaskey & Olds (57) ABSTRACT

A battery pack device includes a conduit compressing against a battery cell array. The conduit is to communicate fluid that is vented from an interior of a battery cell within the battery cell array along a non-linear vent path. The conduit can include an inlet that opens to a vent chamber of the battery cell array. The conduit can be a plate. A foot could extend from the conduit. The non-linear vent path could be a first vent path, and the foot could provide a portion of a second vent path.

17 Claims, 9 Drawing Sheets

(56) References Cited

U.S. PATENT DOCUMENTS

2012/0094155 A1* 4/2012 Lim .................. H01M 2/12
　　　　　　　　　　　　　　　　　　　429/82
2012/0114992 A1　5/2012 Kim et al.
2013/0330579 A1　12/2013 Ejiri et al.

* cited by examiner

BATTERY PACK VENTING

BACKGROUND

Generally, electrified vehicles differ from conventional motor vehicles because electrified vehicles can be selectively driven using one or more battery-powered electric machines. Conventional motor vehicles, by contrast, are driven exclusively by an internal combustion engine. Electric machines can drive the electrified vehicles instead of, or in addition to, the internal combustion engines. Example electrified vehicles include all-electric vehicles, hybrid electric vehicles (HEVs), plug-in hybrid electric vehicles (PHEVs), fuel cell vehicles, and battery electric vehicles (BEVs).

A powertrain of an electrified vehicle typically includes a battery pack having battery cells that store electrical power for the electric machine. From time to time, gas within the interiors of battery cells, such as lithium ion battery cells, can undesirably expand. The battery cells include vents to, if required, allow the expanding gas to escape from the interiors. After moving through the vent, the expanding gas is directed outside of the vehicle.

SUMMARY

A battery pack device according to an exemplary aspect of the present disclosure includes, among other things, a plate having a vent path to communicate a fluid vented from a battery cell. The vent path extends non-linearly between an inlet opening and an outlet opening.

In a further non-limiting embodiment of the foregoing battery pack device, the plate is an end plate.

In a further non-limiting embodiment of any of the foregoing devices, the vent path extends non-linearly within the plate.

In a further non-limiting embodiment of any of the foregoing devices, the vent path includes a first section extending along a first axis and a second section extending along a second axis that is transverse to the first axis.

In a further non-limiting embodiment of any of the foregoing devices, the plate comprises a wall and a foot extending from a vertical bottom portion of the wall.

In a further non-limiting embodiment of any of the foregoing devices, the wall compresses a battery cell array and the foot interfaces with a cold plate.

In a further non-limiting embodiment of any of the foregoing devices, the vent path is a first vent path and the foot provides a portion of a second vent path that receives flow of the fluid from first vent path.

In a further non-limiting embodiment of any of the foregoing devices, the second vent path extends laterally from the first vent path.

A battery pack device according to an exemplary aspect of the present disclosure includes, among other things, a conduit compressing against a battery cell array, the conduit to communicate fluid that is vented from the battery cell array along a non-linear vent path.

In a further non-limiting embodiment of the foregoing battery pack device, the conduit is a plate.

In a further non-limiting embodiment of any of the foregoing devices, the battery pack device includes a foot extending from the conduit.

In a further non-limiting embodiment of any of the foregoing devices, the non-linear vent path is a first vent path, and the foot provides a portion of a second vent path.

In a further non-limiting embodiment of any of the foregoing devices, the second vent path extends laterally from the first vent path.

In a further non-limiting embodiment of any of the foregoing devices, the foot includes a shiplap joint to interface with another foot extending from another conduit.

In a further non-limiting embodiment of any of the foregoing devices, the foot extends from the plate opposite the battery cell array, and the foot interfaces with a cold plate.

In a further non-limiting embodiment of any of the foregoing devices, the array comprises lithium ion battery cells.

A method of venting fluid from a battery pack according to an exemplary aspect of the present disclosure includes, among other things, venting fluid along a non-linear path established within a plate, the fluid from a battery cell array.

In a further non-limiting embodiment of the foregoing method, the method includes compressing the battery cell array with the plate.

In a further non-limiting embodiment of any of the foregoing methods, the fluid along the non-linear path from a first position to second position that is vertically below the first position.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to venting fluid from an interior of a battery cell. In an example embodiment, a vent path is provided within a structural plate of the battery pack in place of a separate vent path structure. The structural wall is a conduit for moving the vented fluid.

Figure 1:
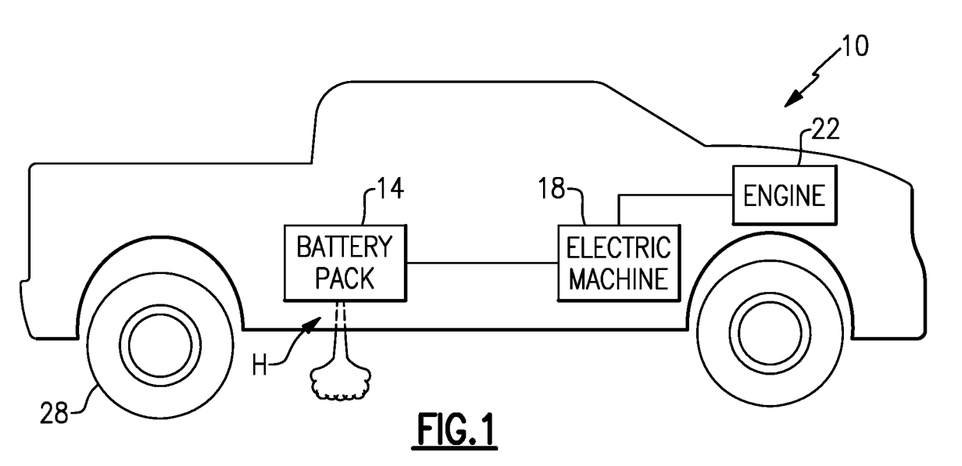
FIG. 1 shows a schematic view of an example electrified vehicle.

Referring to FIG. 1, an example electrified vehicle 10 includes a battery pack 14 to power an electric machine 18. The vehicle 10 further includes an internal combustion engine 22.

The electric machine 18 or the engine 22 selectively drives wheels 28 of the vehicle 10. The electric machine 18 receives electric power from the battery pack 14 and converts the electric power to torque to drive the wheels 28.

Periodically, expanding gases from the battery pack 14 may require venting. The vehicle 10 includes a hose H for venting these gases from the battery pack 14.

The example vehicle 10 is hybrid electric vehicle. In hybrid electric examples, the electric machine 18 may selectively operate as a generator to recharge the battery pack 14. In other examples, vehicle 10 is an all electric vehicle.

The electric machine 18 may include a motor and a separate generator or a combined motor-generator.

In the example electrified vehicle 10, the battery pack 14 is mounted to a load floor beneath a second row seat.

Figure 2:
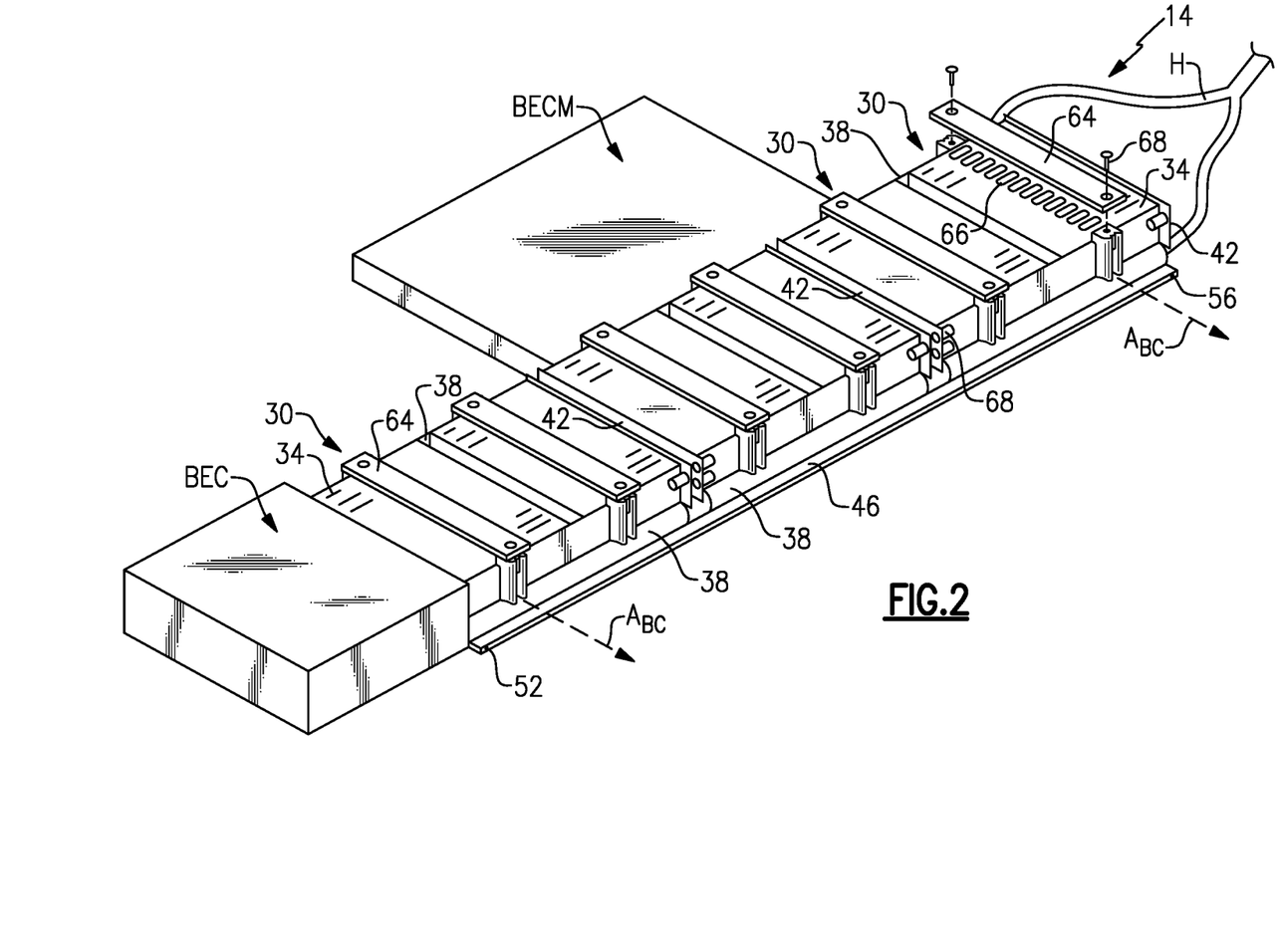
FIG. 2 shows a partially schematic, perspective view of a selected portion of a battery pack from the electrified vehicle of FIG. 1.
Figure 3:
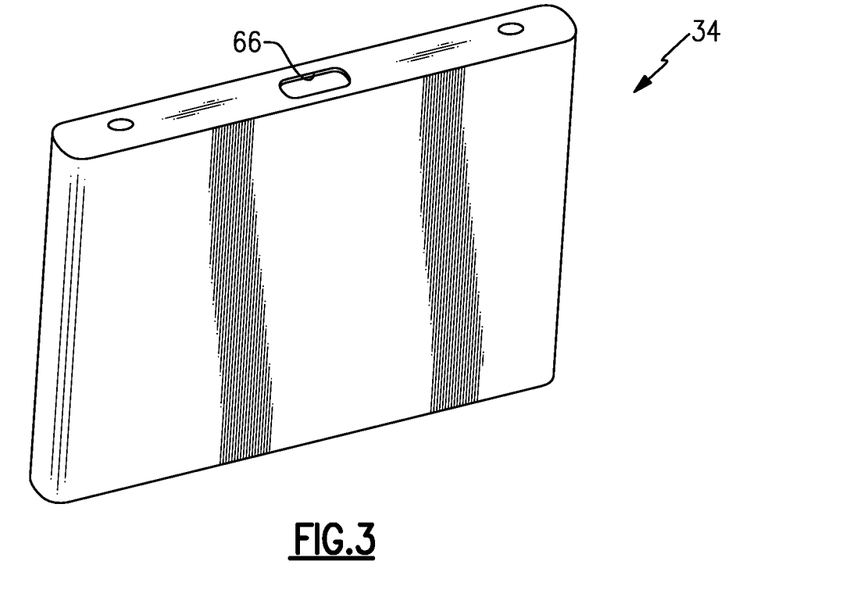
FIG. 3 shows a perspective view of a battery cell from the battery pack of FIG. 2.
Figure 4:
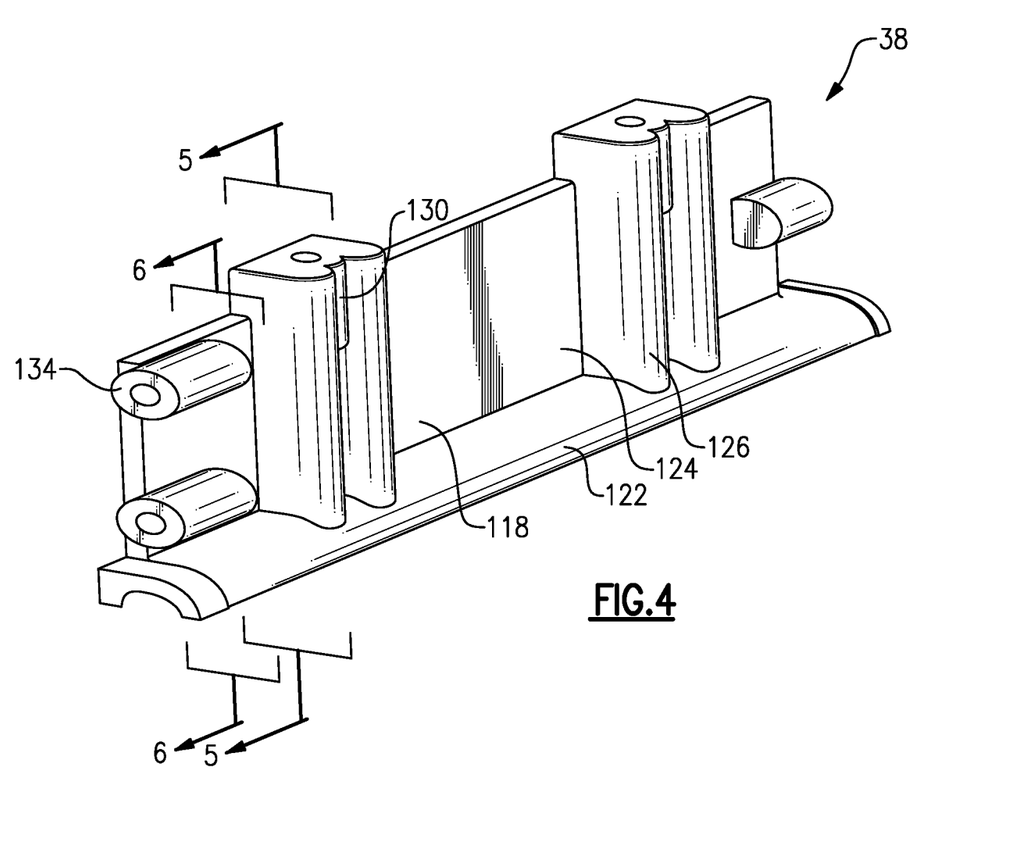
FIG. 4 shows a perspective view of an example plate from the battery pack of FIG. 2.

Referring now to FIGS. 2 to 3, the example battery pack 14 includes a bussed electric center (BEC), a battery electronic control module (BECM), and multiple arrays 30 of individual battery cells 34. In each of the arrays 30, the battery cells 34 are disposed along an axis $A_{BC}$. The battery cells 34 are lithium ion cells in this example.

The battery pack 14 further includes structural plates, such as end plates 38, side plates 42, a cold plate 46, and a cover (not shown). Each array 30 is compressed axially between two of the end plates 38. For each array 30, one of the end plates 38 is at an axial end of the array 30, and another of the end plates 38 is at the other axial end. In this example, each end plate 38 compresses axially against the ends of two different arrays 30. At their laterally outer ends, the end plates 38 connect to the side plates 42. This connection holds the axial positions of the end plates 38. The arrays 30, end plates 38, and side plates 42 are disposed on the cold plate 46.

The example battery pack 14 is cooled via liquid coolant communicated through the cold plate 46. Liquid coolant moves from a coolant supply through an inlet 52 to a coolant path within the cold plate 46. The liquid coolant circulates through the coolant path to absorb thermal energy from the cells 34 and other structures. The liquid coolant then exits the cold plate 46 at an outlet 56.

The example pack 14 includes a plurality of vent chambers 64. Opposing axial ends of each vent chamber 64 each connect to an end plate 38 through one or more mechanical fasteners 68. The vent chamber 64 fits over the vertically upper sides of the cells 34.

For each array 30, the vent chamber 64 extends across all the vent openings 66 for the cells 34. The vent openings 66 and the vent chamber 64 are medial within the associated array 30.

The battery cells 34 each a membrane that covers the vent openings 66 during standard operation. Gas, or another type of fluid, within an interior of the battery cells 34 can expand under certain conditions. Sufficient expansion of gases can force open the membrane providing an open path for the gases to move to the vent chamber 64 through the vent openings 66. The vented gases can consist of about ninety percent nitrogen and about ten percent carbon monoxide.

In this example, the end plates 38 are a conduit for communicating gases from the vent chamber 64 to the hose H (FIG. 1), which the communicates the gases to an exterior of the vehicle 10.

Referring now to FIGS. 4 to 8 with continuing reference to FIG. 2, the end plates 38 provide a vent path P that extends from an inlet opening 100 to an outlet opening 104. Notably the vent path P extends non-linearly. In this example, the vent path P extends parallel to the axis $A_{BC}$ of the array 30, downward toward the cold plate 46, and then laterally outward toward the hose H.

More specifically, the example vent path includes a first section 110 extending along a first vent path axis $A_{VP1}$ and a second section 112 extending along a second vent path axis $A_{VP2}$. The first vent path axis $A_{VP1}$ is transverse to the second vent path axis $A_{VP2}$. In this example, the first vent path axis $A_{VP1}$ is horizontal and aligned with the battery cell array axis A. The second vent path axis $A_{VP2}$ is a vertically extending axis.

The end plates 80 include a wall 118 and a foot 122 that extends from a vertically lower area of the wall 118. The foot 122 provides support to the wall 118 and helps to stabilize the end plates 80 on the cold plate 46. The first section 110 and the second section 112 of the vent path P are provided by the wall 118 in this example. The wall 118 is thus a conduit. In another example, the foot 122 can provide some or all of the first section 110, the second section 112, or both.

The wall 118 includes a planar section 124 and a vertically extending ribs 126 projecting from the planar section 124. The first section 110 and the second section 112 of the vent path P are within the ribs 126.

The wall 118 further includes fastening structures 130 and 134. The fastening structures 130 provide attachment locations for securing the axial ends of the vent chamber 64 to the end plates 38. The fastening structures 134 provide attachment locations for securing the side plates 42 to the end plates 38. The fastening structures 130 and 134 can be threaded bores for receiving one of the mechanical fasteners 68.

In this example, vented gas moves from the outlet opening 104 into a third section 114 of the vent path P. The third section 114 is provided by the foot 122 and the cold plate 70. The third section 114 has a semicircular cross-section. The first section 110 and the second section 112, by contrast, have a circular cross-section.

The third section 114 of the vent path P extends laterally outward from the second vent path axis $A_{VP2}$ along a third axis $A_{VP3}$. The first vent path axis $A_{VP2}$ and the second vent path axis $A_{VP2}$ are both transverse to the third vent path axis $A_{VP3}$. In this example, the first vent path axis $A_{VP1}$, the second vent path axis $A_{VP2}$, and the third vent path axis $A_{VP3}$ are perpendicular to each other.

Figure 5:
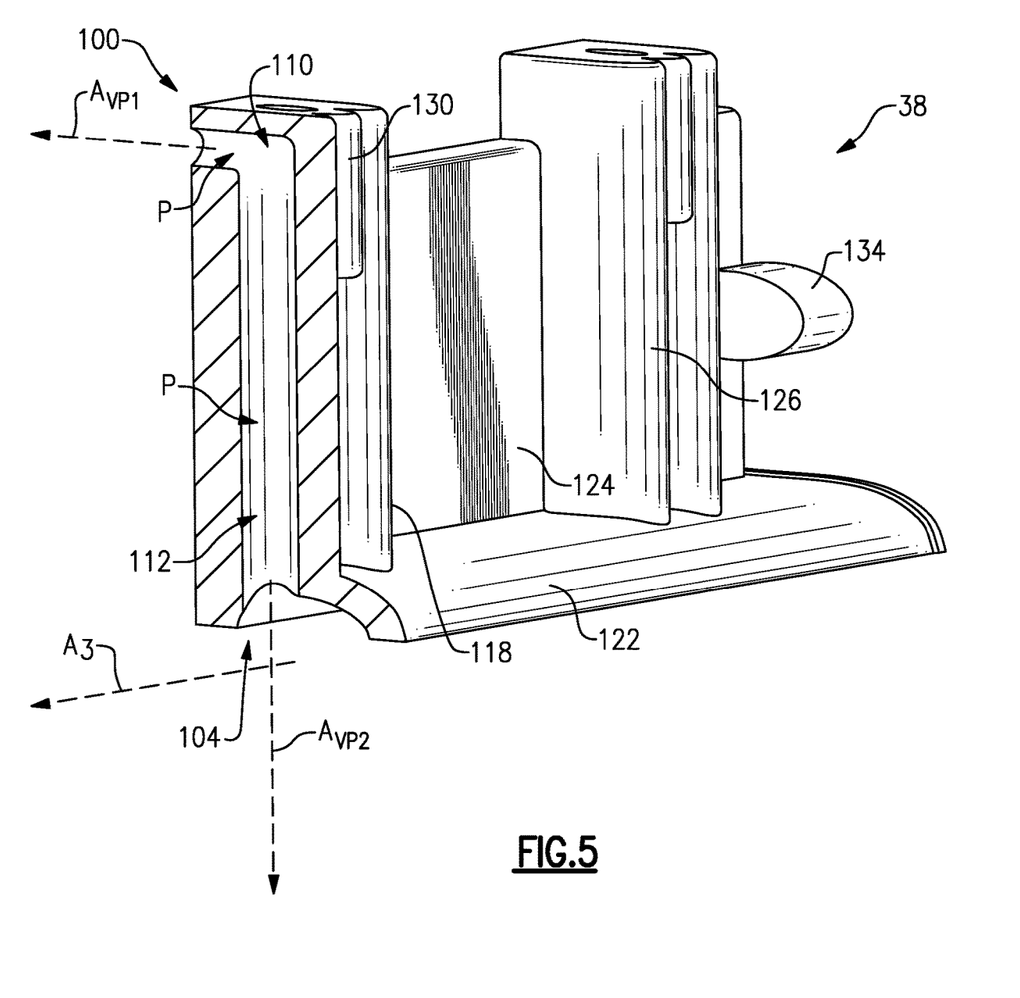
FIG. 5 shows a perspective section view of the plate at Line 5-5 in FIG. 4.
Figure 6:
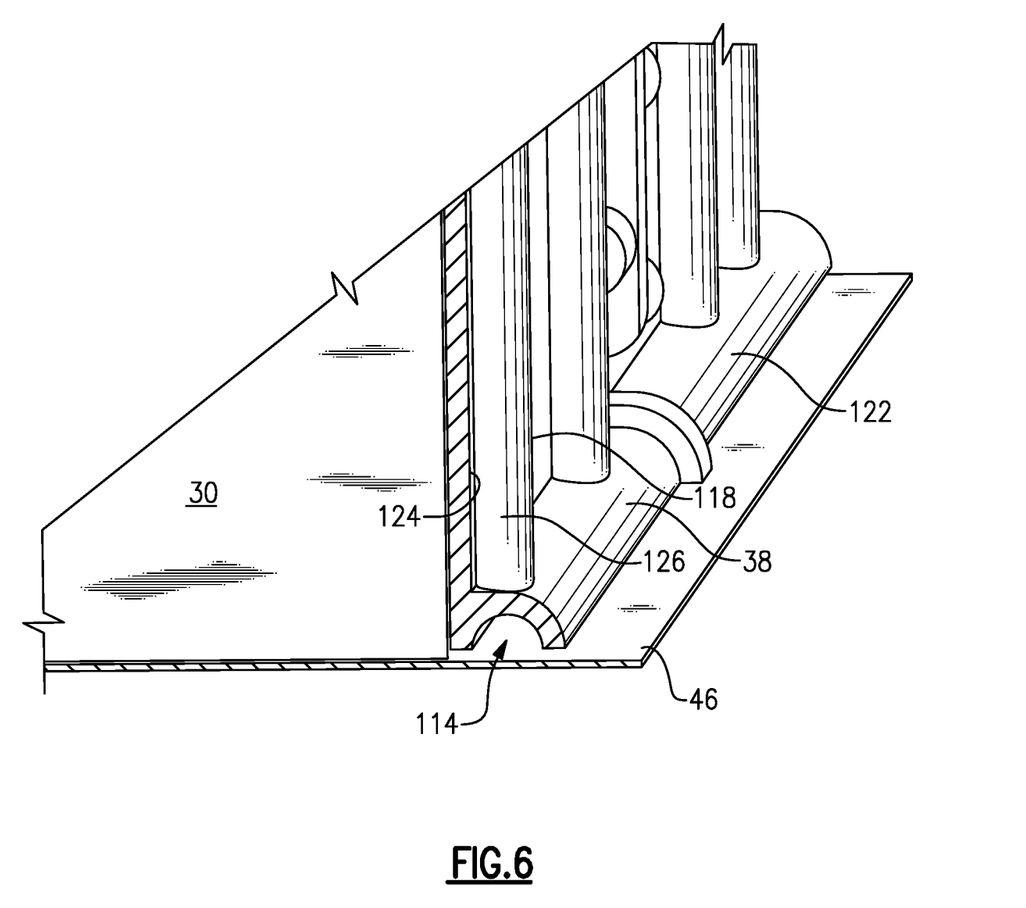
FIG. 6 shows a perspective section view of the vent at line 6-6 in FIG. 4 interfacing with other portions of the battery pack of FIG. 2.
Figure 7:
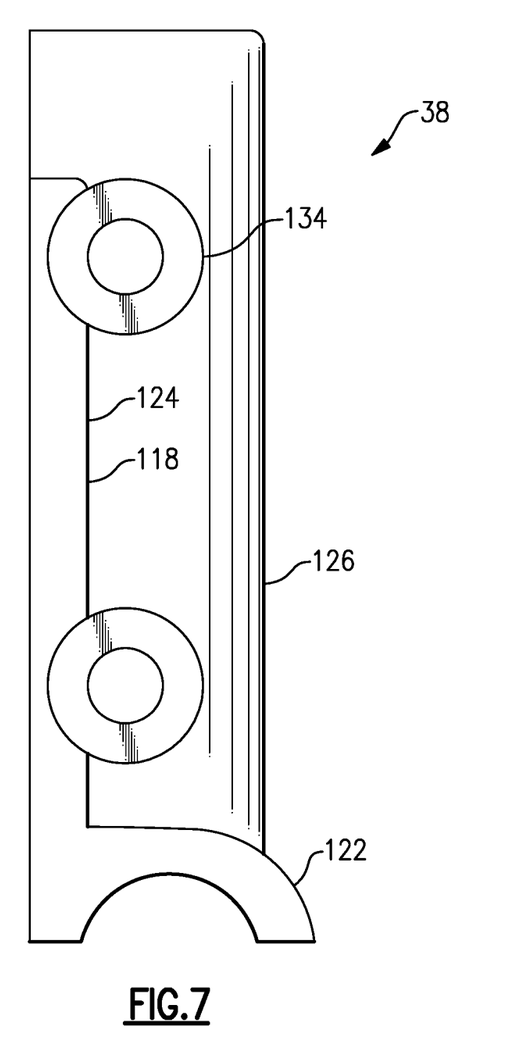
FIG. 7 shows a side view of the plate of FIG. 4.
Figure 8:
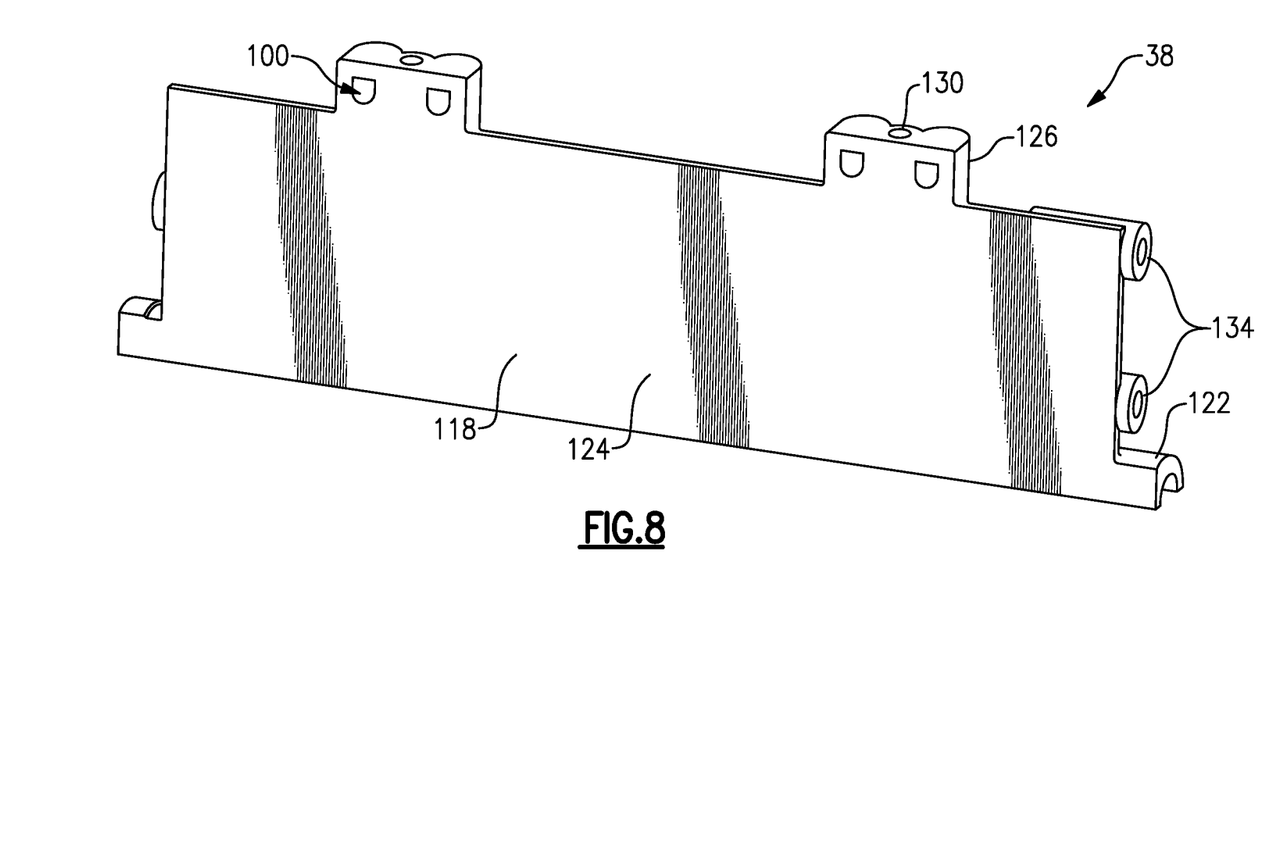
FIG. 8 shows another perspective view of the plate of FIG. 4.
Figure 9:
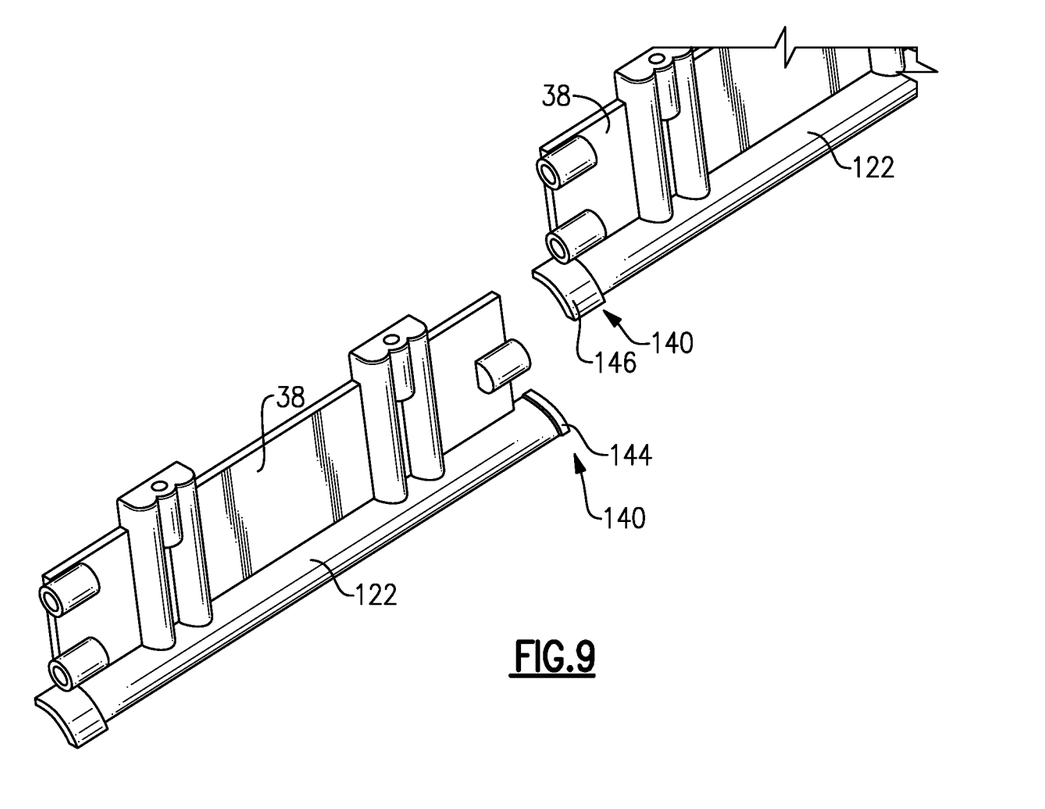
FIG. 9 shows an exploded view of the plate of FIG. 4 and an adjacent plate from the battery pack of FIG. 2.
Figure 10:
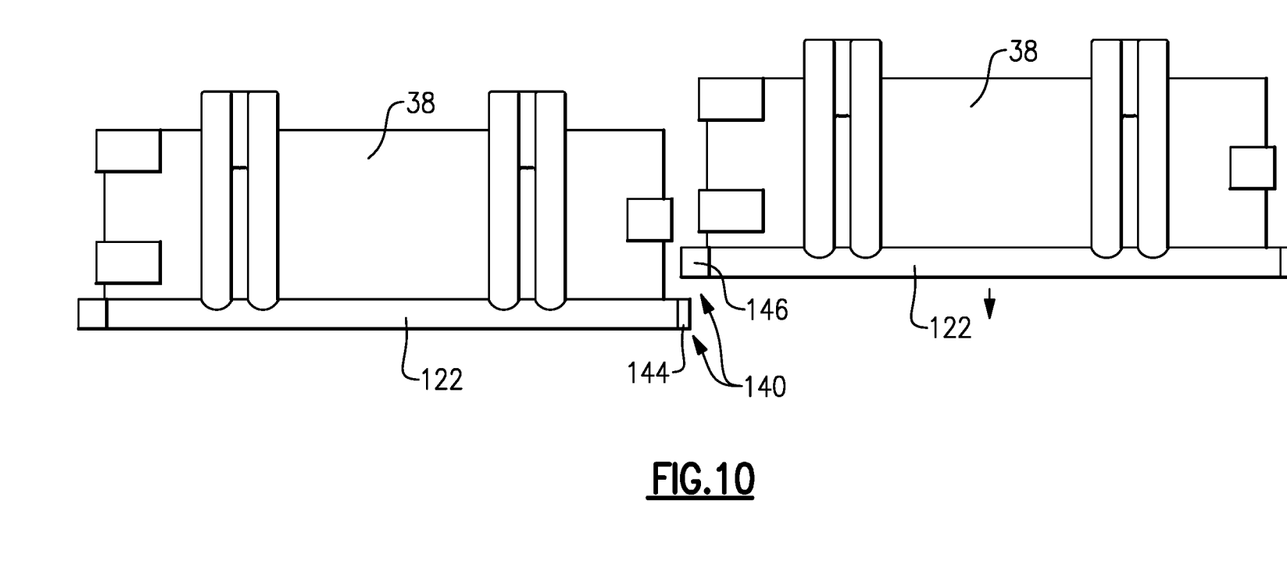
FIG. 10 shows a front view of the plates of FIG. 10.

Referring now to FIGS. 9 and 10 with continuing reference to FIGS. 2 and 5, In this example, a laterally end of the foot 122 includes a connection feature 140 for interfacing with a foot of a laterally adjacent end plate within the pack 14. The connection feature 140 comprises a recessed foot area 144 and a raised foot area 146.

During assembly, the raised foot area 146 is placed over the recessed foot area 144 of a laterally adjacent end plate 38. The interfaces between the feet 122 of the endplates 38 are shiplap joints in this example.

The third sections 114 of the end plates 38 along a side of the pack 14 are thus connected together. Vented gas moves along the third sections 114 to a first lateral end of the pack 14.

The feet 122 of the end plates 38 at the first lateral end of the pack 14 are coupled to the hose H. The vented gas moves from these end plates 38 to the hose H, which communicates the gas outside the vehicle 10. The third sections 114 of the end plates 38 connecting to the hose H, could potentially include gas vented from any of the cells 34 in the pack 14, even the cells 34 closest to the BEC.

The feet 122 at a second lateral end of the pack 14, which is opposite the first lateral end, may be blocked to prevent gas from escaping.

Mastic, an adhesive, or another type of sealant seals the interfaces between the foot 122 and the foot 122 of the adjacent end plate 38. Sealant can also be used to seal interfaces between the foot 122 and the cold plate 70.

The end plates 38 are cast of aluminum in this example. The inlet openings 100 each face in the direction of die pull. Slides can be used to provide other portions of the vent path P during casting.

Features of selected disclosed embodiments include a conduit providing a non-linear flow path for gases vented from a battery cell. The conduit compresses cells of the battery pack. Providing the vent path within an end plate reduces complexity and reduces part requirements. Further, the vented gases for each individual array within the pack are sealed rather than the entire pack being sealed together. The integrated venting provides reduced part count and reduced assembly steps.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A battery pack device, comprising:
a conduit compressing against a battery cell array, the conduit to communicate fluid that is vented from an interior of a battery cell within the battery cell array along a non-linear vent path, the conduit including an inlet that opens to a vent chamber of the battery cell array, wherein the conduit is a first plate at an axial end of the battery cell array, the battery cell array is compressed axially between the first plate and a second plate at an opposing axial end of the battery cell array, each of the battery cells within the battery cell array are positioned axially between the first plate and the second plate.

2. The battery pack device of claim 1, further comprising a foot extending from the conduit.

3. The battery pack device of claim 2, wherein the non-linear vent path is a first vent path, and the foot provides a first perimeter portion of a second vent path, the foot interfacing with a cold plate that provides a second perimeter portion of the second vent path, the cold plate disposed adjacent the battery cell array such that the cold plate can take on thermal energy directly from the battery cell array.

4. The battery pack device of claim 3, wherein the second vent path extends laterally from the first vent path.

5. The battery pack device of claim 4, wherein the foot includes a shiplap joint to interface with another foot extending from another conduit.

6. The battery pack device of claim 2, wherein the foot extends from the conduit opposite the battery cell array, and the foot interfaces with a cold plate that is separate from the foot, the cold plate disposed directly adjacent the battery cell array such that the cold plate can take on thermal energy from the battery cell array.

7. The battery pack device of claim 1, wherein the conduit is a plate having the non-linear vent path, and the non-linear vent path extends non-linearly between the inlet opening and an outlet opening, wherein the plate provides an axially outermost portion of the battery cell array.

8. The battery pack device of claim 1, wherein the non-linear vent path includes a first section extending along a first axis and a second section extending along a second axis that is transverse to the first axis.

9. The battery pack device of claim 1, wherein the plate comprises a wall and a foot extending from a vertical bottom portion of the wall, wherein the wall compresses a battery cell array and the foot interfaces with a cold plate that is separate and distinct from the plate, the cold plate disposed directly adjacent the battery cell array such that the cold plate can take on thermal energy directly from the battery cell array.

10. A battery pack device, comprising:
a conduit compressing directly against a battery cell array and adapted to communicate gas that is vented from the battery cell array along a vent path that extends non-linearly between an inlet opening and an outlet opening,
wherein the conduit is a plate, and the vent path includes a first section extending along a first axis and a second section extending along a second axis that is transverse to the first axis.

11. The battery pack device of claim 10, wherein the conduit is a first conduit with a first foot extending from the first conduit, and further comprising a second conduit with a second foot extending from the second conduit, the first foot interfacing with the second foot through a shiplap joint.

12. The battery pack device of claim 11, wherein the second section includes the outlet opening, and the outlet opening opens to a third section of the vent path, the third section having a first perimeter portion provided by the first foot and the second foot, and a second perimeter portion provided by a cold plate that is separate from the first foot and the second foot.

13. The battery pack device of claim 2, further comprising the vent chamber and the battery cell array, wherein the battery cells each include a vent opening that selectively communicates fluid from the interior of the battery cell to the vent chamber.

14. The battery pack device of claim 13, further comprising a membrane covering the vent opening, the membrane configured to open in response to expansion of fluid within the battery cell to permit the fluid to move through the vent opening to the vent chamber.

15. The battery pack device of claim 10, wherein the outlet opening opens to a fluid communication path that exhausts the gas to an exterior of a vehicle having the battery cell array.

16. A battery pack device, comprising:
a conduit compressed against an array of battery cells each having a vent opening; and
a vent chamber in fluid communication with the vent openings, the conduit having an inlet that opens to the vent chamber, the conduit providing a vent path to communicate a gas from the vent chamber along a vent path that extends non-linearly between the inlet opening and an outlet opening; and
a membrane covering the vent opening to block a flow of gas from an interior of the battery cell to the vent chamber, the membrane opening in response to an expansion of gas within the interior to permit a flow of the gas from the interior to the vent chamber.

17. The battery pack device of claim 16, wherein the outlet opening opens to a fluid communication path that exhausts the gas to an exterior of a vehicle having the array of battery cells.

* * * * *